Oct. 19, 1943.　　　T. R. PORTER ET AL　　　2,332,111
STERILE TOILET
Filed July 18, 1942　　　4 Sheets-Sheet 3
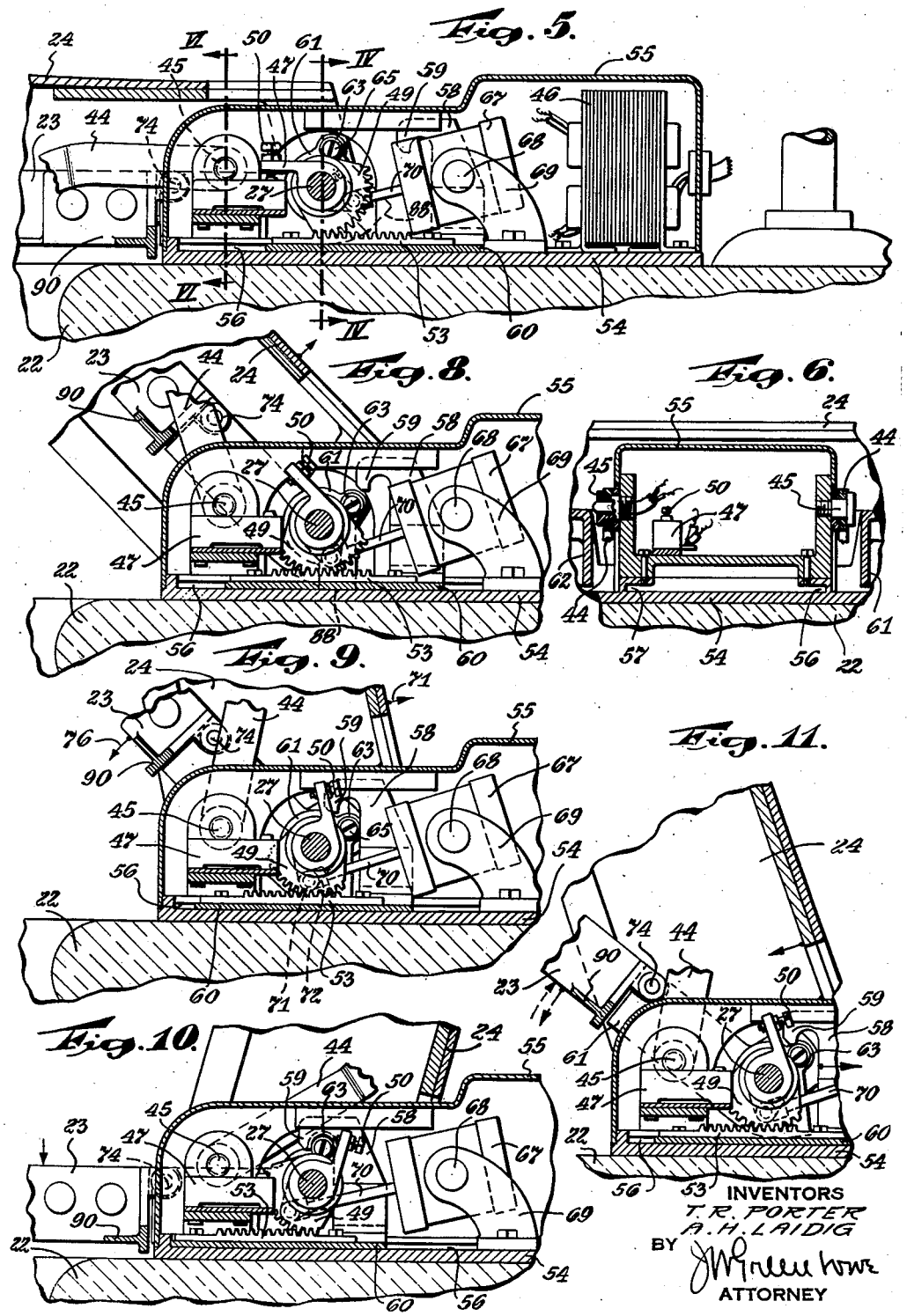
INVENTORS
T. R. PORTER
A. H. LAIDIG
BY
ATTORNEY Oct. 19, 1943.   T. R. PORTER ET AL   2,332,111
STERILE TOILET
Filed July 18, 1942   4 Sheets-Sheet 4
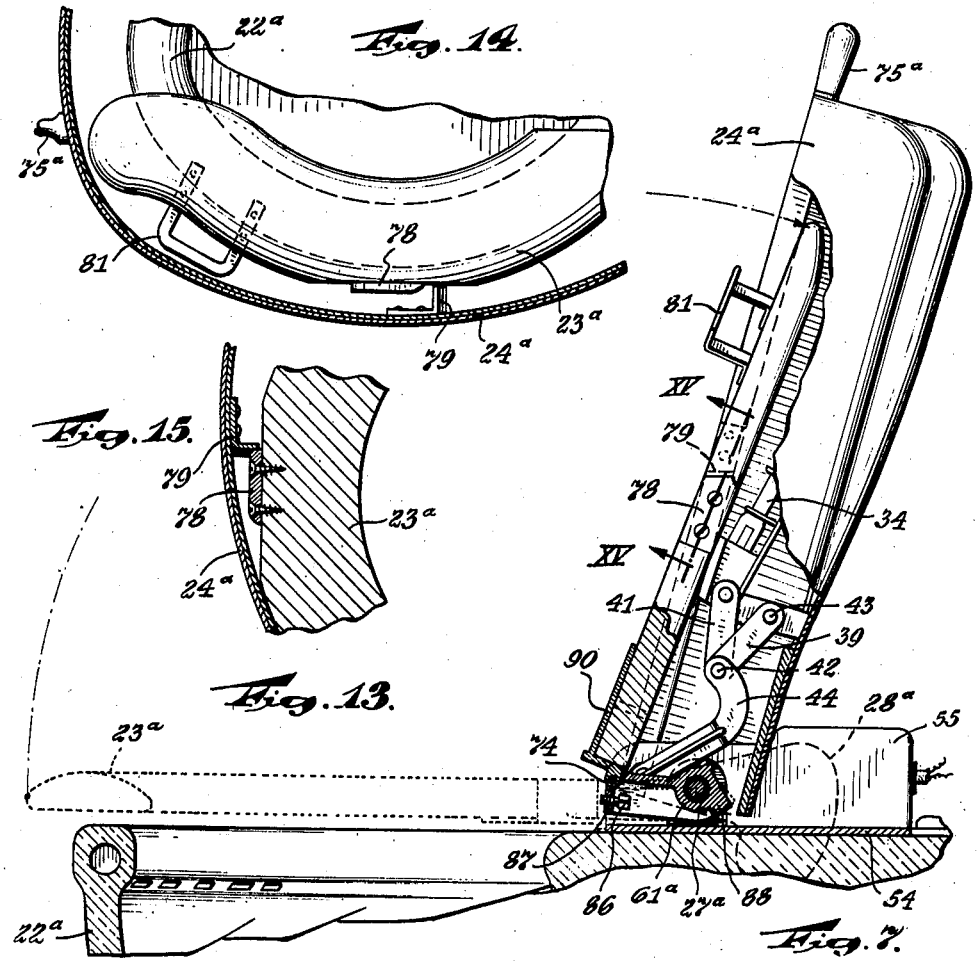
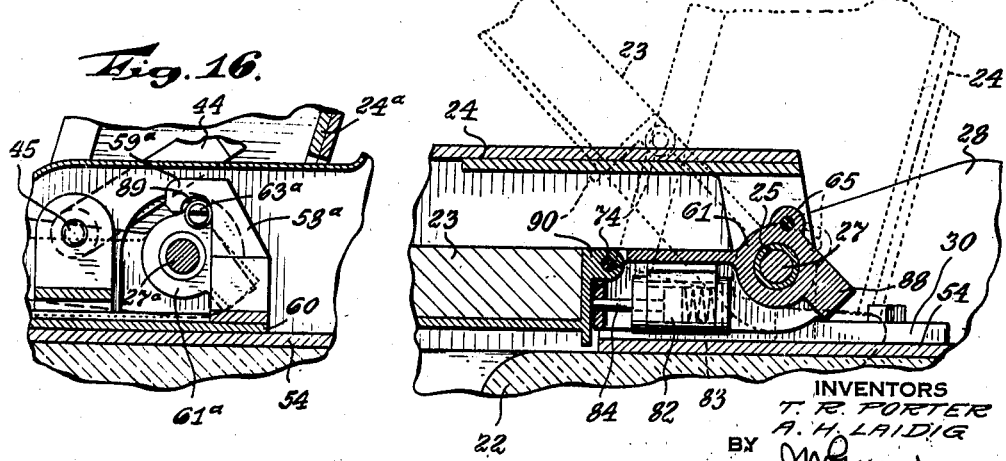
INVENTORS
T. R. PORTER
A. H. LAIDIG
BY
ATTORNEY Patented Oct. 19, 1943

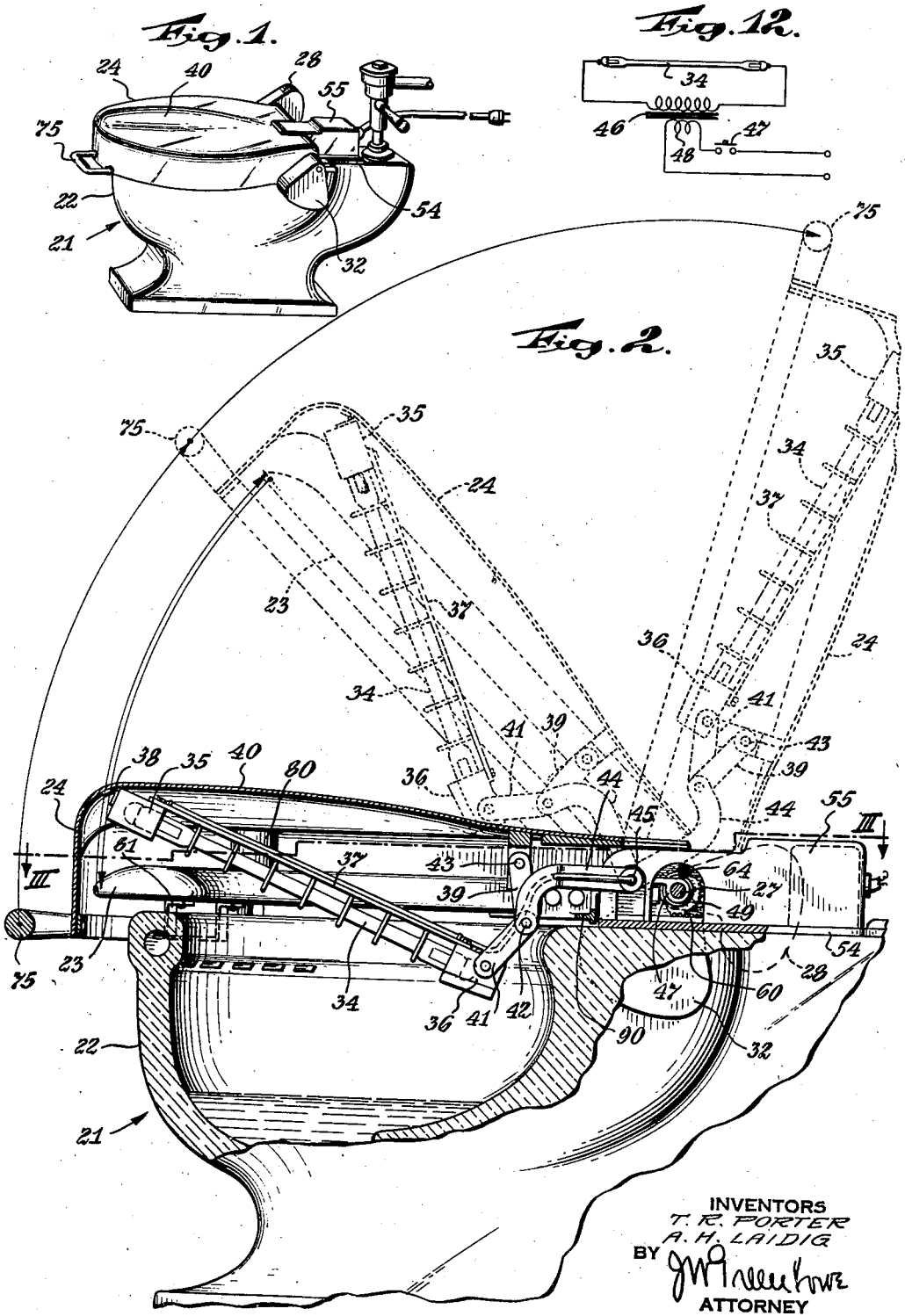

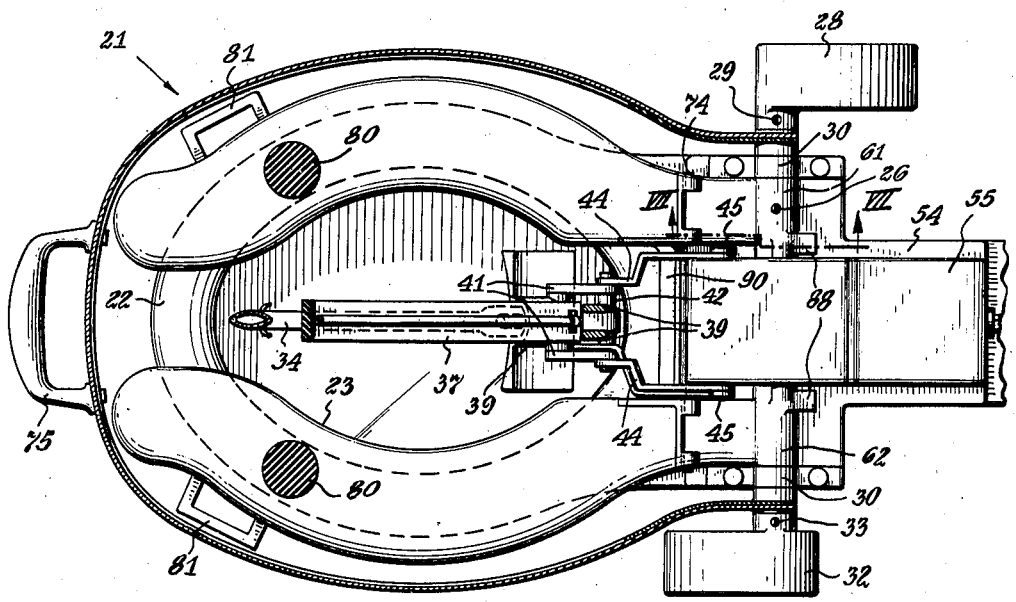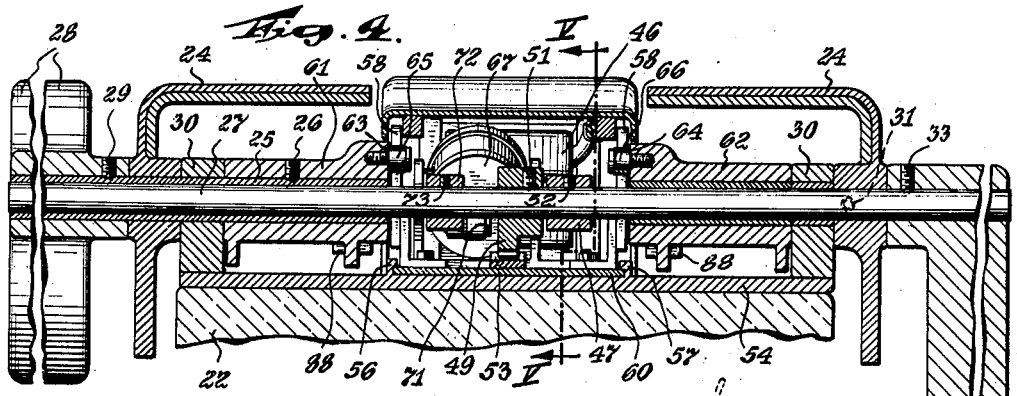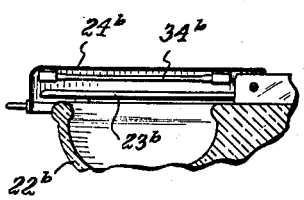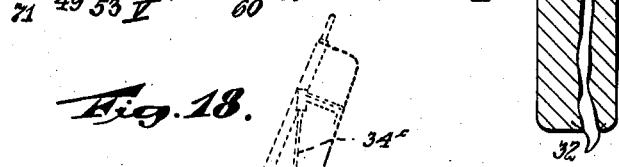

2,332,111

UNITED STATES PATENT OFFICE 2,332,111

STERILE TOILET

Thomas R. Porter, Cedar Grove, and Alfred H. Laidig, Bloomfield, N. J., assignors to Westinghouse Electric & Manufacturing Company, East Pittsburgh, Pa., a corporation of Pennsylvania Application July 18, 1942, Serial No. 451,436

15 Claims. (Cl. 4—233)

This invention relates to toilets and more particularly to one including apparatus for sterilizing and maintaining sterile the seat and bowl.

The principal object of our invention, generally considered, is to provide a toilet with an ultraviolet lamp and appropriate mechanism associated therewith to make the toilet sterile and maintain it in sterile condition.

Another object of our invention is to provide a toilet with an ultraviolet lamp attached to the cover thereof, so that when closed it creates and maintains sterility of the underlying seat and bowl, mechanism being provided for shutting off the lamp when the cover is raised.

A further object of our invention is to provide means for mounting an ultraviolet lamp in the optimum position for sterilizing and maintaining an associated toilet seat and bowl in sterile condition, while providing for moving said lamp out of the way and deenergizing the same when the cover of said seat is raised.

Other objects and advantages of the invention, relating to the particular arrangement and construction of the various parts, will become apparent as the description proceeds.

Referring to the drawings:

Fig. 1 is a perspective view of sanitary toilet apparatus embodying our invention.

Fig. 2 is a longitudinal vertical sectional view of the apparatus shown in Fig. 1.

Fig. 3 is a horizontal sectional view on the line III—III of Fig. 2, in the direction of the arrows.

Fig. 4 is a vertical sectional view on the line IV—IV of Fig. 5, in the direction of the arrows.

Fig. 5 is a vertical sectional view on the line V—V of Fig. 4, in the direction of the arrows.

Fig. 6 is a fragmentary vertical sectional view on the line VI—VI of Fig. 5, in the direction of the arrows.

Fig. 7 is a fragmentary vertical sectional view on the line VII—VII of Fig. 3, in the direction of the arrows.

Fig. 8 is a fragmentary view, corresponding to Fig. 5, but showing the positions of the parts when the cover is partly raised and the seat has reached the highest position permitted by its stop cam.

Fig. 9 is a view corresponding to Fig. 8, but showing the positions of the parts upon further raising the cover and just before the actuating brackets start to push the seat back to horizontal position.

Fig. 10 is a view corresponding to Fig. 9 but showing the final or operative positions of the cover and seat.

Fig. 11 is a view corresponding to Fig. 10 but showing the positions of the parts after release and starting of the return movement to closed position.

Fig. 12 is a wiring diagram for the ultraviolet lamp.

Fig. 13 is a view corresponding to Fig. 2, but showing both seat and cover in raised position and illustrating a modification.

Fig. 14 is a fragmentary view corresponding to Fig. 3 but further illustrating the embodiment of Fig. 13.

Fig. 15 is a fragmentary sectional view on the line XV—XV of Fig. 13, in the direction of the arrows.

Fig. 16 is a fragmentary view corresponding to Fig. 10, but further illustrating the embodiment of Figs. 13 to 15, inclusive.

Fig. 17 is a view corresponding to Fig. 2, but showing another embodiment of our invention.

Fig. 18 is a view also corresponding to Fig. 2, but showing a further embodiment of our invention.

Referring to the drawings in detail, and first considering the embodiment of our invention illustrated in Figs. 1 to 12, inclusive, there is shown a toilet 21 comprising a bowl 22, a seat 23 and a cover 24. The seat 23 has hub portions 61 and 62 the former of which is fixed to a bushing 25 by means of a set screw 26. The bushing 25 is pivotally mounted on a shaft 27 which extends from one side to the other of the apparatus. On the outer end of the bushing 25 is a counterweight 28 for the purpose of urging the seat to raised position, a set screw 29 serving to prevent relative rotation betwen the counterweight and the bushing.

The cover 24 is fixed on the shaft 27, pivotally mounted in bearings 30 upstanding from the base plate 54, by set screw 31 at one end, while pivotally mounted on bushing 25 at the other end, as shown most clearly in Fig. 4. Counterweight 32 is fixed to the shaft 27 by set screw 33, and serves to urge the cover to closed position.

In order to sterilize the seat and bowl or maintain them in a sterile condition, an ultraviolet lamp 34 is mounted on the cover 24 so that when the apparatus is not in use it is energized to emit bactericidal ultraviolet rays to sterilize not only the seat but the bowl of the toilet. For this purpose the lamp 34 is desirably of the type identified by the trade-mark "Sterilamp" and manufactured by the Westinghouse Electric & Manufacturing Company under its Patent No. 2,258,765, dated October 14, 1941.

The supporting apparatus for the lamp comprises end sockets 35 and 36 connected by a protecting frame device 37, one socket 35 being hinged to the cover at the upward bulge 40 therein, as indicated at 38, and the other hingedly supported by toggle mechanism comprising twin links 39 and twin links 41 connected by a common pivot pin 42, and the upper links 39 being pivoted to the cover as indicated at 43. The toggle 39—41 is operated by curved offset twin levers 44 extending from the pin 42 and pivoted to the bowl as indicated at 45. Thus it will be seen that upon raising the cover 24 from the full line position to the extreme dotted position shown in Fig. 2, the mechanism 39—41—44 operates to retract the lamp 34 within the outline of the cover 24 to protect it from injury. Socket 36 may be elongated as shown in Figs. 2 and 3 to serve as a back rest when cover is up.

The lamp 34 is operated from a transformer 46 through a switch 47 in the power line to the primary winding 48, as shown by the wiring diagram in Fig. 12. The switch 47, provided with an adjustable contact member 50, is illustrated in closed position in Figs. 2 and 5 and in open position in Figs. 8, 9, 10 and 11.

In order to provide for locking the cover 24 in open position, against the action of its counterweight 32, after the same has been raised and while the seat 23 is lowered or in horizontal position, the shaft 27 has a gear segment 49 secured thereto by set screw 51, and disposed adjacent the switch element 47 which may likewise be secured to the shaft by set screw 52. The gear segment 49 engages a rack 53 mounted on a plate 60 slidable on the base plate 54 of a housing 55 secured to the rear portion of the bowl 22, said plate 60 being slidable between tracks 56 and 57 upstanding from the base plate 54 and carrying locking brackets 58 provided with downwardly opening hook portions 59 for the purpose of holding the cover in elevated position after raising, while the seat is in horizontal or nearly horizontal position.

In order to accomplish this locking action, the seat hubs 61 and 62 are provided, respectively, with rollers 63 and 64 pivoted thereto by bolts 65 and 66, as shown most clearly in Fig. 4. These rollers are operatively engaged by the brackets 58 (see Fig. 7) and finally received in the hooks 59 thereof when the cover is fully raised and the seat fully lowered, as shown in Fig. 10. The brackets 58 push forward on the rollers, prior to being engaged in the hooks 59, to lower the seat 23 against the action of its counterweight 28 after the cover 24 is raised. To absorb shocks, a cylinder 67 is pivotally mounted on the plate 54, as indicated at 68 by means of brackets 69 and carries a piston (not shown), the rod 70 from which is connected by a pivot pin 71 which is connected to a crank 72 fixed on the shaft 27 by a set screw 73. Rubber bumpers 80 are also desirably provided on the bottom surface of the cover 24.

The seat, which in the present embodiment comprises two leaves connected by a hinge butt member 90, is desirably pivoted to the hub portions 61 and 62 thereof, as indicated at 74, in order to allow for raising the seat 23 while the cover 24 is raised. To cushion shocks, in case the seat is released before reaching its lowermost position after disengagement from the cover 24, shock absorbing devices 82 may be provided on the hub 61 of the seat, comprising springs 83 pushing outwardly on plungers 84, which in turn engage the hinge butt portion 90 of the seat 23, as shown in Fig. 7.

Having now described the construction of the parts, the operation of the apparatus is as follows: The seat is normally down and enclosed in the cover, as shown in full lines in Fig. 2, with the lamp circuit closed through switch 47, as shown in Fig. 5, and the lamp 34 generating bactericidal radiations which impinge on the seat and bowl, efficiently sterilizing the contactable portions thereof. The seat 23 is to be exposed by pulling up on the handle 74 on the cover 24, the final positioning of the latter being shown to the extreme right in Fig. 2. Upon raising the cover the switch 47 is opened, deenergizing the lamp 34 and the seat follows it under the action of its counterweight 28, from the position shown in Fig. 5, to that shown in Fig. 8, where upward movement is stopped by engagement of the hub extension 88 with the base plate 54, as illustrated in Fig. 7.

Further raising of the cover 24 brings the brackets 58 forward to engage the rollers 63 and 64. Further movement beyond this point of engagement, results in pushing the seat down as indicated by the arrow 76, through pressure on the pivot bolts 65 and 66, while the cover is still in the course of being raised, as indicated at 77. The final position of the seat is shown in Fig. 10, where the rollers 64 and 65 have reached the uppermost positions and been received in locking engagement with respect to the hooks 59 on the brackets 58. This engagement prevents lowering of the cover 24 while the seat is held down in horizontal or substantially horizontal position.

Upon release of the seat from the position shown in Fig. 10 it will automatically rise under the influence of the counterweight 28, as shown in Fig. 11, until the rollers 64 and 65 pass from under the hooks 59 of the brackets 58, thereby unlocking the cover and allowing it to descend by action of its counterweight 32, too rapid descent being prevented by action of the cylinder 67 and its enclosed piston acting as a dash-pot.

Referring now to the embodiment of our invention illustrated in Figs. 13 to 16, inclusive, a construction is there shown which is identical with that of the preceding embodiment except that locking means is provided between the seat and cover for preventing the former from dropping from elevated position. In this embodiment the locking means takes the form of cam members 78, one fixed to each side of the seat 23ª, which interlockingly engage keepers 79 disposed on the inside of the cover 24ª when both are elevated as shown in Fig. 13. Engagement between the cams 78 and keepers 79 is permitted by the rotation of the seat hub portion 61ª about the supporting shaft 27ª, when the cams 78 are snapped into place behind the keepers 79. Operation of the counterweight 28ª prevents undesired disengagement between the seat and cover from the position shown in Fig. 13, but permits manual disengagement without much effort by grasping the handle 81 and pulling the seat from the nesting position with respect to the cover 24ª. Adjustment between the seat and its hub portion may be effected by one or more set screws 86 threadably engaging the front flange 87 of the seat hub 61ª.

In order to allow for the necessary movement of the hub 61ª when the cams 78 snap into engagement with the keepers 79, or are released therefrom, reference being had to Fig. 16, enough clearance, indicated at 89, is provided between the hook portions 59ª of the brackets 58ª to allow for this movement without disturbing the position of the cover 24ª.

Referring now to the embodiment of our invention illustrated in Fig. 17 a construction is there shown in which the lamp 34ᵇ is disposed parallel to the flat top portion of the cover 24ᵇ and fixed, rather than articulated thereto and operated by means of toggle mechanism as described in connection with the first embodiment. In this embodiment the top of the seat 23ᵇ is irradiated but the bowl 22ᵇ therebeneath is shaded to a greater extent than when the lamp is positioned as shown in the first embodiment. The construction of the mechanism of the present embodiment may otherwise correspond with that of the first embodiment.

Fig. 18 illustrates a further embodiment of our invention in which the lamp 23ᶜ is fixed to the cover 24ᶜ and normally inclined in a direction opposite to that disclosed in Fig. 2. This construction is disclosed merely as an alternative, as the seat is not believed to be as effectively irradiated as in connection with the first embodiment. Except as specifically illustrated, the construction of this last embodiment may correspond with that of the first.

It will be understood that in any one or all of the embodiments, means may be provided for automatically flushing the toilet upon release of the seat and prior to the automatic return of the cover to closed position.

Although preferred embodiments of our invention have been disclosed, it will be understood that modifications may be made within the spirit and scope of the appended claims.

We claim:

1. In combination, a toilet seat, a seat cover, an associated bowl, means pivoting said seat and cover with respect to said bowl so that the seat and cover may be moved between down or bowl-covering position and up or bowl-exposing position, means for sterilizing and maintaining sterility of said seat and bowl when the cover is down over it, and means for deenergizing said sterilizing means when the cover is raised.

2. In combination, a toilet seat, a seat cover, an associated bowl, means pivoting said seat and cover with respect to said bowl so that they may be moved between down or bowl-covering position and up or bowl-exposing position, sterilizing means attached to said cover and protected thereby when the latter is down, and switch means in circuit with said sterilizing means, normally closed when the cover is down, and open when it is raised, whereby said sterilizing means is actuated only when the seat is enclosed by the cover, with the sterilizing means in place for irradiating the seat and bowl.

3. In combination, a toilet seat, a seat cover, an associated bowl, means pivoting said seat and cover with respect to said bowl, so that the seat and cover may be moved between down or bowl-covering position and up or bowl-exposing position, an ultraviolet lamp mounted on said cover for sterilizing and maintaining sterile said seat and bowl, and means for energizing said lamp when the cover is down and deenergizing the same when said cover is raised.

4. In combination, a toilet seat, a seat cover, an associated bowl, means pivoting said seat and cover with respect to said bowl so that they may be moved between down or bowl-covering position and up or bowl-exposing position, an ultraviolet lamp attached to said cover and protected thereby when the latter is down, and switch means actuated by movement of said cover and in circuit with said ultraviolet lamp, whereby said lamp is energized when the cover is down and deenergized when the cover is raised.

5. In combination, a toilet seat, a seat cover, an associated bowl, means pivoting said seat and cover with respect to said bowl so that the seat and cover may be moved between down or bowl-covering position and up or bowl-exposing position, a counterweight for urging said seat to open position and one for urging said cover to closed position, interlocking means between said seat and cover whereby said seat is allowed to follow said cover to a partly open position and then further raising of said cover moves said seat to closed or horizontal position.

6. In combination, a toilet seat, a seat cover, an associated bowl, means pivoting said seat and cover with respect to said bowl so that they may be moved between down or bowl-covering position and up or bowl-exposing position, sterilizing means attached to said cover and protected thereby when the latter is down, switch means in circuit with said sterilizing means, closed when the cover is down, and open when the cover is raised, and means actuated by said cover after said seat and cover have been partly raised to return said seat to lower or horizontal position, said means also serving to lock said cover in open position while said seat is in horizontal or substantially horizontal position.

7. In combination, a toilet seat, a seat cover, an associated bowl, means pivoting said seat and cover with respect to said bowl so that the seat and cover may be moved between down or bowl-covering position and up or bowl-exposing position, an ultraviolet lamp mounted on said cover for sterilizing said seat and bowl, a switch in circuit with said lamp and a source of power, means controlling said switch from said cover so that the lamp is energized only when the cover is closed, a counterweight for urging said seat to open position and one for urging said cover to closed position, interlocking means between said seat and cover whereby said seat is allowed to follow said cover to a partly open position and then further raising of said cover moves said seat to closed or horizontal position.

8. In combination, a toilet seat, a seat cover, an associated bowl, means pivoting said seat and cover with respect to said bowl so that the seat and cover may be moved between down or bowl-covering position and up or bowl-exposing position, an ultraviolet lamp pivoted at its outer end in a cavity in the underside of said cover, toggle mechanism connecting the other end of said lamp to the rearward portion of said cover, and means pivoted with respect to the bowl for retracting said toggle mechanism to pull the lamp toward the cover as the latter is raised, and means for respectively energizing and deenergizing said lamp when the cover is down and up.

9. In combination, a toilet seat, a seat cover, an associated bowl, means pivoting said seat and cover with respect to said bowl so that they may be moved between down or bowl-covering position and up or bowl-exposing position, an ultraviolet lamp, means pivoting the outer end of said lamp with respect to said cover, toggle means connecting the inner end of said lamp to a rear portion of said cover, a lever connecting said toggle means to said bowl to effect movement of said lamp towards its cover after the latter is raised, and switch means actuated by said cover to energize the lamp when the cover is down thereover and deenergize the same when the cover is up.

10. In combination, a toilet seat, a seat cover, an associated bowl, means pivoting said seat and cover with respect to said bowl so that they may be moved between down or bowl-covering position and up or bowl-exposing position, and means carried by said seat which, when the latter is lowered, interlocks when the cover is open, with a member geared to the latter, whereby after raising said cover the same is held in locked position until release of the seat from horizontal position.

11. In combination, a toilet seat, a seat cover, an associated bowl, means pivoting said seat and cover with respect to said bowl so that they may be moved between down or bowl-covering position and up or bowl-exposing position, counterweight means for urging said cover to closed position and said seat to open position after the cover is raised, means actuated by said cover as it is raised beyond a predetermined point to return the seat to horizontal position, and means for locking said cover in open position while said seat is in horizontal position.

12. In combination, a toilet seat, a seat cover, an associated bowl, an ultraviolet lamp mounted on the inside of said cover directly over the seat and bowl and in substantially horizontal position when said cover is down, and means for energizing said lamp when in said horizontal position and deenergizing it when the cover is raised.

13. In combination, a toilet seat, a seat cover, an associated bowl, an ultraviolet lamp mounted on the inside of said cover directly over the seat and bowl and inclined downwardly toward the front of said seat when said cover is down, and means for energizing said lamp when the cover is down over it and deenergizing it when the cover is raised.

14. In combination, a toilet seat, a seat cover, an associated bowl, an ultraviolet lamp mounted on the inside of said cover directly over the seat and bowl and inclined downwardly toward the rear of said seat when said cover is down, and means for energizing said lamp when the cover is down over it, and de-energizing it when the cover is raised.

15. In combination, a toilet seat, a seat cover, an associated bowl, an ultraviolet lamp mounted on the inside of said cover directly over the seat and bowl and inclined downwardly toward the rear of said seat when said cover is down, means for withdrawing said lamp for protection within the outline of said cover when the latter is raised, and means for energizing said lamp when the cover is down over it and de-energizing it when raised.

THOMAS R. PORTER.
ALFRED H. LAIDIG.